Apr. 24, 1923.
P. V. HOLLENBECK
1,453,111
MECHANISM FOR MEASURING THE CUBIC CONTENTS OF BODIES
Filed April 19, 1921    4 Sheets-Sheet 3
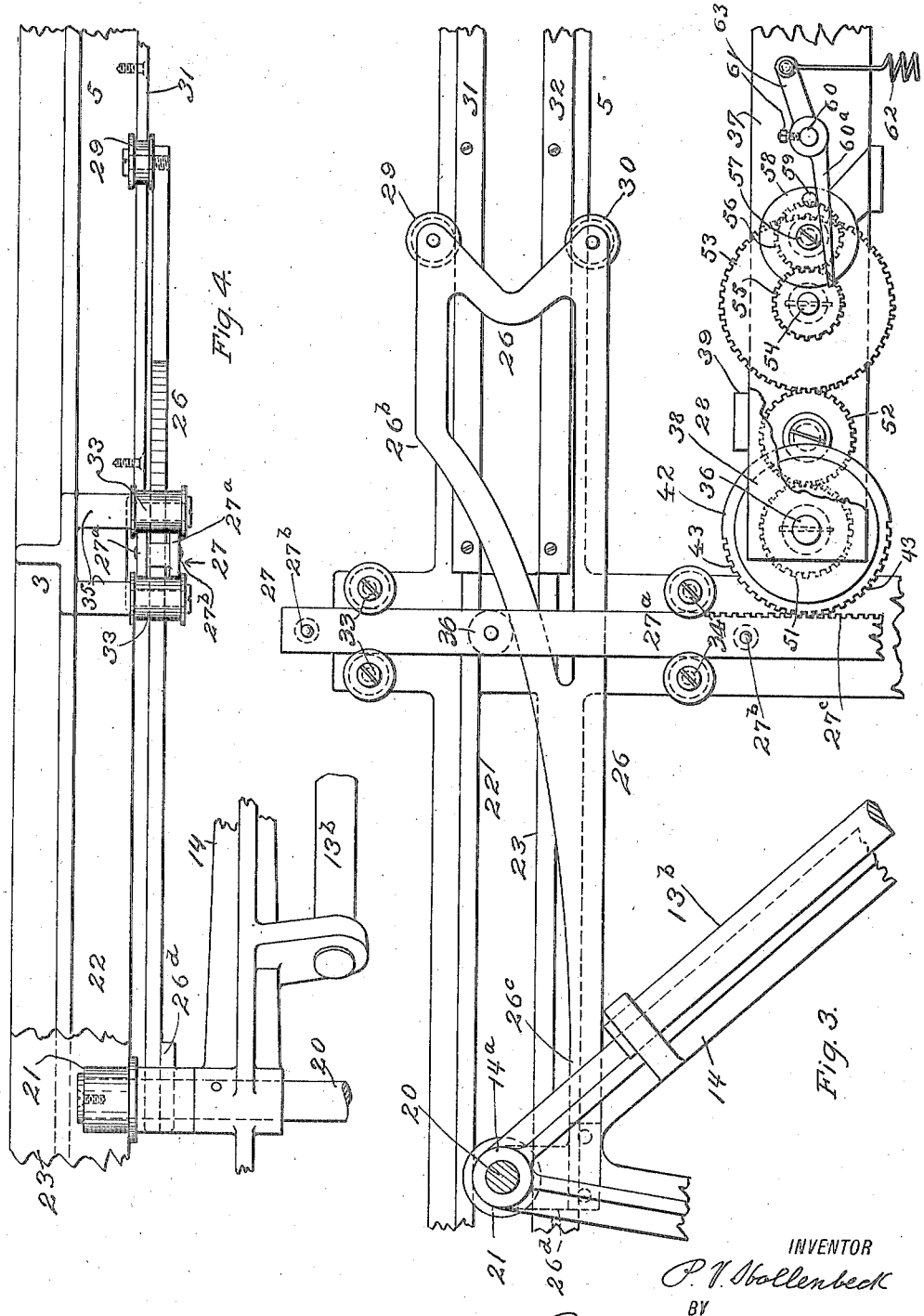

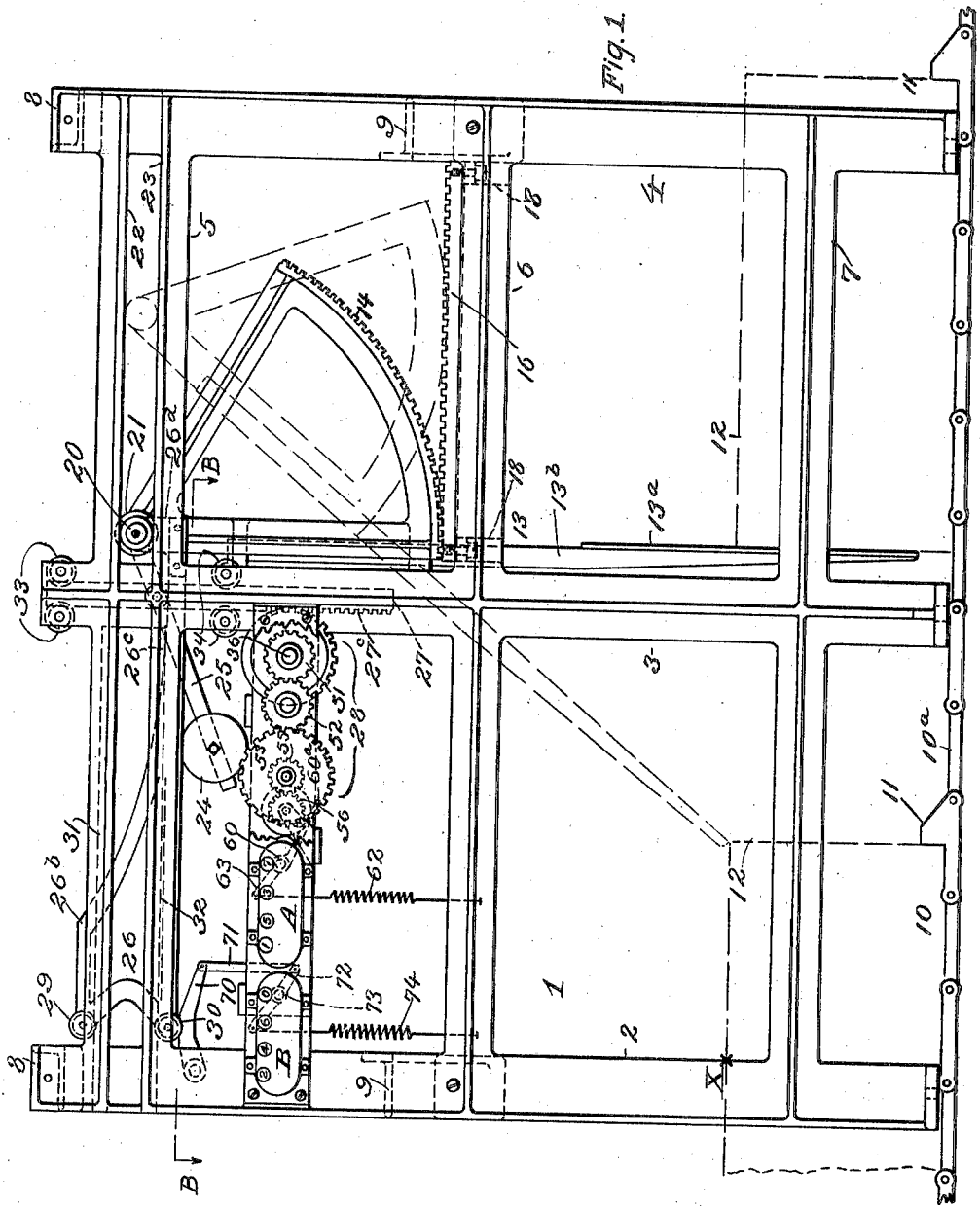

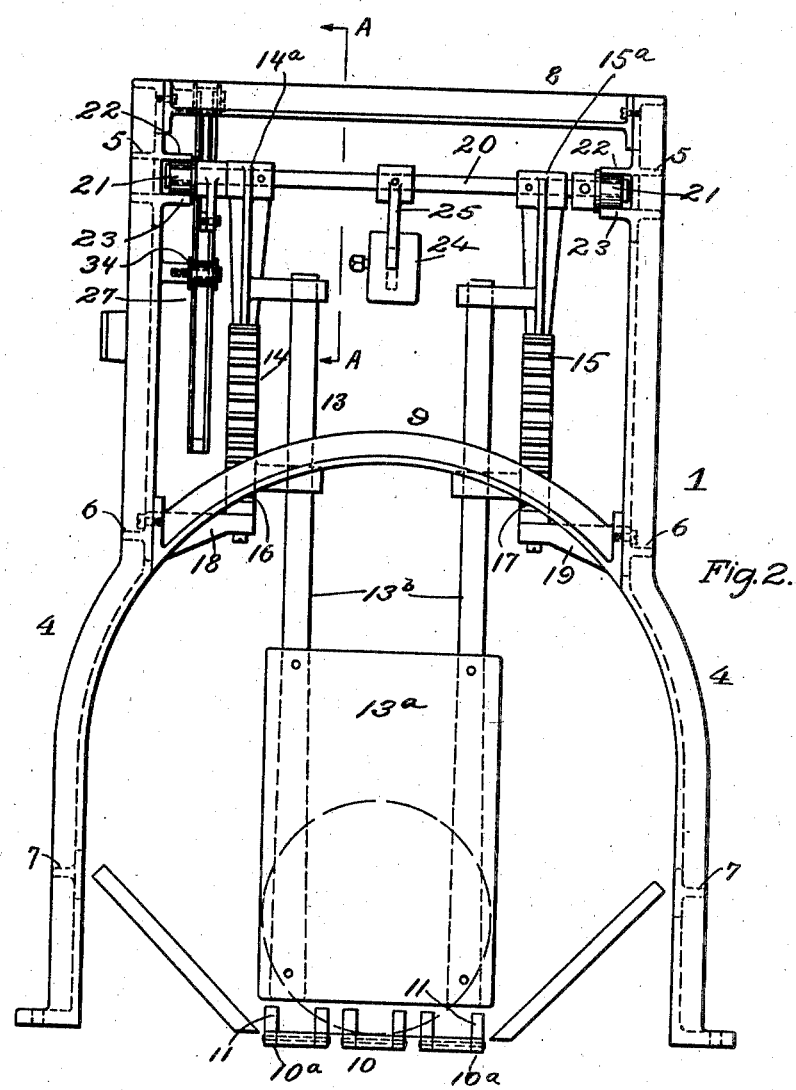

Apr. 24, 1923.

P. V. HOLLENBECK 1,453,111

MECHANISM FOR MEASURING THE CUBIC CONTENTS OF BODIES

Filed April 19, 1921

INVENTOR
P. V. Hollenbeck
BY
Rogers, Kennedy & Campbell
ATTORNEYS.

Patented Apr. 24, 1923.

1,453,111

UNITED STATES PATENT OFFICE.

PAUL V. HOLLENBECK, OF NEW YORK, N. Y., ASSIGNOR TO INTERNATIONAL PAPER COMPANY, A CORPORATION OF NEW YORK.

MECHANISM FOR MEASURING THE CUBIC CONTENTS OF BODIES.

Application filed April 19, 1921. Serial No. 462,689.

*To all whom it may concern:*

Be it known that I, PAUL V. HOLLENBECK, a citizen of the United States, residing at New York city, in the county of New York and State of New York, have invented certain new and useful Improvements in Mechanism for Measuring the Cubic Contents of Bodies, of which the following is a specification, reference being had therein to the accompanying drawing.

This invention relates to a machine for measuring the volume or solid contents of bodies, and the invention is an improvement on the apparatus described and claimed in the application for patent filed by me on the 4th day of June 1920 Serial No. 386,611. The machine of said application was designed with special reference to the measurement of the cubic contents or volume of logs or billets of wood used in the manufacture of paper pulp, and said machine comprises a swinging feeler member standing normally in an upright position in the path of the bodies to be measured, which are advanced endwise by a suitable conveyor, and the said bodies contacting with the feeler member in succession, act to subject the same to successive displacing movements according to the diameters of the bodies, the said feeler member after each displacing movement swinging back to its normal upright position in the path of the next body or log. Through suitable actuating mechanism, the successive displaced movements of the feeler member operate a registering mechanism, the actuating mechanism being of such form and so proportioned in its action to the amount of movement of the feeler member and to the registering mechanism, that the latter will indicate, for a given length of body, the solid volume or contents of the same. In said machine the axis of the feeler member occupies a constant or fixed position, and in the displacements of the member, its end in contact with the log traverses a path coincident with an arc having the axis of the feeler member as its center, and according to the diameter of the log, the point at which the feeler member will disengage one log preparatory to its return swing to normal position for the next log, is at a greater or less distance from the vertical plane of said axis. This condition necessitates the spacing of the logs on the conveyor at distances apart corresponding to the distance from the vertical plane of the axis to the point to which the feeler is moved by the log. For logs of relatively small diameters, such spacing would not affect the capacity of the machine to a material extent, but for larger logs say as great as thirty inches in diameter, the spacing of the logs on the conveyor would have to be so great in order for the feeler after disengaging one log to return to its upright normal position before being engaged by the next log, that much space would be lost on the conveyor, and the capacity of the machine would be reduced.

According to the present invention I so arrange the feeler member that the distance from its normal position to that to which its end in contact with the log is moved, is materially less for a given diameter of log than in said former machine, so that I am enabled to space the logs on the conveyor at materially closer intervals and thus provide for the measurement of larger sized logs and still maintain the capacity of the machine within practical limits. This result is effected by mounting the feeler member on an axis or fulcrum which is movable, and providing means whereby when the free end of the member is moved forwardly by the advancing log or body, its fulcrum will be shifted in the opposite direction. In other words the feeler member is subjected to two movements, namely, a swinging movement on its pivotal axis in one direction, and a bodily movement in another direction. The result is that the path of movement of the free end of the member approaches more nearly the vertical as it moves up under the influence of the advancing log and as it moves down and back to meet the next log, so that the logs may be carried on the conveyor in closer spaced relations.

My invention consists also in improvements in the form, construction and operation of the actuating mechanism between the feeler member and the registering mechanism, whereby said mechanism is operated with certainty and a high degree of accuracy.

The invention also consists in the details of construction and combination of parts hereinafter described and claimed.

In the accompanying drawings:

Fig. 1 is a side elevation of my improved machine.

Fig. 2 is an end elevation of the same as viewed from the right in Fig. 1.

Fig. 3 is a sectional elevation on the line A—A of Fig. 2 on an enlarged scale.

Fig. 4 is a top plan view of the parts shown in Fig. 3, the registering mechanism and counting mechanism being omitted.

Figures 5, 6, 7:
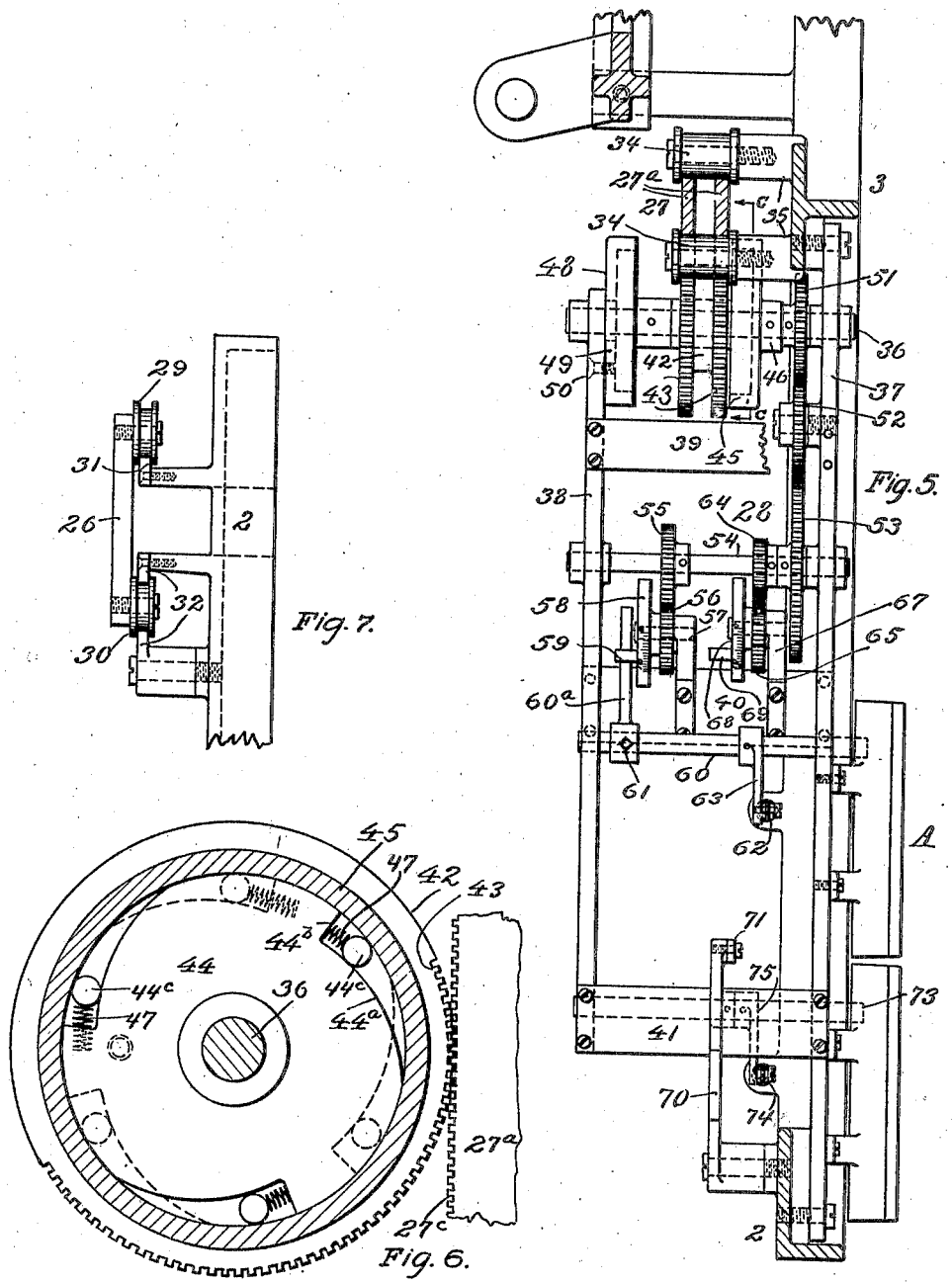
Fig. 5 is a horizontal sectional plan view on the line B—B of Fig. 1.
Fig. 6 is a sectional elevation of certain parts of the actuating mechanism by which the registering mechanism is operated by the feeler member.
Fig. 7 is a fragmentary end elevation of the actuating cam of the actuating mechanism, and the means by which it is guided in its movements.

Referring to the drawings:

The operative parts of my machine are mounted in and sustained by a frame 1 consisting in the present instance of three inverted U-shaped frame members 2, 3 and 4 adapted to rest on and be secured to the floor, and connected together in fixed relations to constitute a unitary frame structure, by means of upper intermediate and lower longitudinal frame members 5 and 6 at the opposite sides, and upper and lower transverse frame members 8 and 9 at the ends.

A conveyor device 10 for the logs or bodies to be measured is arranged to travel longitudinally between the legs of the U-shaped frame members, which conveyor device in the present instance is in the form of a number of endless chains 10ᵃ provided at intervals with upstanding carrier lugs or cleats 11 which engage the rear ends of logs 12 and act in the travel of the chains to advance the logs endwise to the action of the machine.

13 designates a feeler member arranged in an upright position within the frame in the path of the advancing logs, and mounted to be swung at its lower end forwardly by one log and rest on the upper surface thereof and on disengaging the log to swing back to its normal upright position in front of the next log. These displaced movements of the feeler member, the extent of which is determined by the diameters of the respective logs, are utilized to operate a registering mechanism A to indicate the cubic contents of the logs, and a suitable actuating mechanism to be presently described, is arranged between the feeler member and the registering mechanism, said parts being so relatively constructed and proportioned that for a given length of body or log, the displaced movement of the feeler member will effect the operation of the registering mechanism to measure the cubic contents of the body. The mounting and operation of the feeler member is such that it is subjected to two movements, namely, a forward swinging movement, as the free end of the member is carried upwardly by the advancing log and is thus displaced laterally with respect to its initial position, and a bodily rearward movement, and while these two movements may be imparted to the feeler member in a variety of ways, I prefer to so construct and arrange the parts that the bodily rearward movement will be effected automatically by the forward swinging movement, and in the accompanying drawings I show the parts so constructed and arranged.

This feeler member is constructed in the form of a plate 13ᵃ having fixed to it two parallel bars 13ᵇ which extend upwardly therefrom as best shown in Figs. 1 and 2. At their upper ends the two bars are fixed respectively to two vertical segment gears 14 and 15 supported by and meshing with horizontal longitudinally extending racks 16 and 17 fixedly sustained on bracket arms 18 and 19 projecting inwardly from the longitudinal frame bars 6. At their apices, the segment gears are provided with hubs 14ᵃ and 15ᵃ mounted on and fixed to a horizontal transverse shaft 20, on the opposite ends of which, rolls 21 are loosely journaled and are adapted to travel longitudinally in guideways formed between flanges 22 and 23 projecting inwardly from the respective longitudinal frame bars 5.

In the construction described, the shaft 20 with the rolls thereon supported on the flanges 22, constitutes an axis or fulcrum for the feeler member, and due to the cooperation of the segment gears with the racks when the free end of the feeler member is swung forwardly by the advancing log, this fulcrum will be shifted positively rearwardly in its guideways and will thus impart to the feeler member a rearward bodily shifting movement. This bodily movement will continue as long as the free end of the feeler member is rising in its forward swing, and it will terminate at the moment that the end of the feeler member reaches the upper surface of the log. As the log now passes thereunder, the feeler member will remain passive or practically so, and as the rear end of the log disengages the feeler member, the latter will swing back to its normal upright position in front of the next log, such return movement being insured by a counterbalancing weight 24 mounted adjustably on an arm 25 affixed to and extending forwardly from the shaft 20.

The dotted lines in Fig. 1 indicate the point to which the free end of the feeler member is displaced laterally from its normal position when resting on the upper surface of the log, and due to the automatic bodily rearward movement of the feeler member in taking this position, the amount of forward lateral displacement is about one-half what it would have been had the fulcrum of the feeler member been fixed as in the machine of my said application. In such case, the free end of the feeler member in order to reach the upper surface of the log, would have to move forward laterally to the point X.

The actuating mechanism by which the registering mechanism is operated by the displaced movements of the feeler member, includes a horizontal longitudinally shiftable cam member 26 moving in a rectilinear path, a vertically reciprocating rack bar 27 operated by the cam member and moving in a rectilinear path, and a gear train 28 operated by the rack bar and in turn operating the registering mechanism.

The cam member 26 is in the present instance in the form of an open frame whose upper active cam edge is curved inwardly and downwardly from its highest point $26^b$ at the forward end, to its lowest point $26^c$ at the rear end, this curved edge constituting the active camming surface of the member. At its rear end the member has fixed to it an upwardly extending bracket $26^d$ which is mounted loosely on the shaft 20 near one end, so that in the back and forth movements of the shaft as described, the cam member will be moved with it. The cam member is guided at its front end in such movements, by means of upper and lower rollers 29 and 30 which travel on horizontal longitudinal rails 31 and 32 extending between the frame members 2 and 3 at one side, and supported by brackets extending inwardly from said frame members as best shown in Figs. 2 and 7.

The rack bar 27 is in the form of two rails $27^a$ connected together in fixed spaced relations by means of spacing washers and through bolts $27^b$, thereby constituting a unitary structure with rack teeth $27^c$ in the forward edges of the two rails. The rails of the rack bar extend on opposite sides of the sliding cam member, and the rack bar is guided in its vertical reciprocations by means of upper and lower pairs of spaced rollers 33 and 34 journaled on brackets 35 extending inwardly from the side of the frame member 3, the rollers being traversed by the opposite edges of the rails as shown in Figs. 3 and 4. The rack bar is operated by the cam member through the medium of a roller 36 journaled between the rails of the rack bar and resting on the cam surface $26^a$ the movement of the cam member rearwardly to the right in Fig. 1, bringing the high part of the cam beneath the roller and moving the rack bar upwardly, and the movement of the cam member in the opposite direction, permitting the rack bar to descend, it being remembered that the cam member is moved rearwardly when the feeler member is swung forwardly by the advancing log, so that in each displaced movement of the feeler member by the logs, the rack bar is moved upwardly.

The gear train is operated by the rack bar in such manner that these upward movements of the rack bar will be accumulated in the gear train, while the descending movements of the rack bar will be idle ones and will have no driving effect on the gear train. This action is effected by interposing a clutch device between the rack bar and the driving shaft 36 of the gear train, of such form that in its upward movement the rack bar will be clutched to the shaft and will operate it, and in its downward movement the rack bar will be unclutched from the shaft. There are many forms of clutch devices suitable for operation in this manner, but I prefer to adopt the form of clutch shown in Figs. 1, 3 and 6. Here it will be seen that the driving shaft 36 is mounted at its outer end in a bearing on a horizontal bar 37 extending between and fixed to the upright frame bars 2 and 3, and at its inner end is mounted in a bearing on a bar 38 extending parallel with the bar 37 and sustained in fixed relation thereto by means of three transverse horizontal bracket arms 39, 40 and 41 to which it is fixed and which bracket arms extend inwardly from the bar 37. A wheel 42 loosely surrounds the driving shaft and is formed with two segment gears 43 meshing with the two toothed rails of the rack bar 27. The hub of wheel 42 carries a disc 44 whose peripheral edge is provided with a number of cam surfaces $44^a$ extending from the periphery of the disc towards its axis and terminating in radial shoulders $44^b$. The disc is surrounded by an overhanging flange 45 on the edge of a circular plate having a hub 46 fixed to the shaft 36, and rollers $44^c$ are arranged between the cam surfaces and the flange 45 and are engaged by springs 47 bearing against the shoulders and acting to urge the rollers toward the contracted ends of the spaces between the cam surfaces and the flange. As a result of this construction, when the rack bar 27 is moved upwardly by the rearward movement of the cam member due to the operation of the feeler member by the advancing log, segment gear wheel 42 will be turned by the rack bar, and the rollers $44^c$ of the clutch being wedged between the cam surfaces on the disc and the flange of the circular plate, the latter will be turned and will impart a corresponding turning motion to the shaft 36. When however the rack bar moves down when released by the cam member in the return movement of the feeler member after disengaging the log, the rollers $44^c$ of the clutch will be released and the disc 44 will be permitted to move within the flange of the circular plate without imparting motion thereto. In order that the driving shaft will be free from any liability of backward movement in the idle descending movements of the rack bar, I provide the shaft with a clutch device 48 similar to that described, but arranged for reverse action. In this case the disc with the cam surfaces, is fixed to the shaft 36, while the circular plate with the overhanging flange 49, is mounted loosely on the shaft but is fastened as at 50 to the side of the bar 38 of the frame or to some other relatively fixed part of the frame. The cam surfaces on the disc are arranged to face in a direction opposite the cam surfaces on the disc of the other clutch, so that while clutch 48 will permit the shaft to turn when the rack bar is moved upwardly, the shaft will be locked against back movement by the wedging action of the cam surfaces on the rollers of clutch 48. Of course other means may be employed to thus prevent the return movement of the shaft between its advancing movements, the special clutch device illustrated and described being shown merely by way of example and as constituting an effective means for accomplishing the result.

Shaft 36 has fixed to it at the outer side of the driving clutch, a gear wheel 51 which meshes with an idler pinion 52 journaled on a stud on the frame bar 37, and this pinion meshes in turn with a gear wheel 53 fixed to a horizontal transverse shaft 54 journaled in bearings in the frame bars 37 and 38. Shaft 54 has fixed to it a gear wheel 55 meshing with a gear wheel 56 on a shaft 57 journaled in bearings in an arm 57ª fixed to the bracket 40 before alluded to. Shaft 57 carries a disc 58 from the side of which a pin 59 projects and constitutes a revolving member, the purpose of which will presently appear. Extending parallel with shaft 54 is a rock shaft 60 mounted in bearings in the frame bars 37 and 38 and having its forward end operatively connected with the operating gearing of the registering mechanism A before alluded to, which latter is fixed to the front of the machine frame as shown in Fig. 1. Shaft 60 is rocked to operate the registering mechanism, by means of the revolving pin 59 which in its revolutions engages an arm 60ª extending beneath and in the path of the pin and provided at its forward end with a hub surrounding the rock shaft and adjustably fixed thereto by a set screw 61. As a result of the construction described, when the pin 59 is revolved by the rotation of disc 58, the pin engaging the arm 60ª will rock said arm periodically corresponding to the successive cycles of operation of the pin, the arm being held yieldingly in the path of the pin by a spring 62 connected at its lower end to the frame bar 9 and connected at its upper end to an arm 63 fixed to and projecting forwardly from the rock shaft.

The registering mechanism A may be of the conventional standard form, and the form and relation of the operative connections between the feeler member and registering mechanism is such that for a given length of log or body, the displaced movement of the feeler member, determined and controlled by the diameter of the log, will actuate the registering mechanism to indicate the solid contents or volume of the log in cubic yards, the successive movements of the feeler member by the engagement therewith of the successive logs, and the successive reciprocations of the rack bar 27 by the cam member 26, being accumulative in the rotation of the driving shaft 36 and in the gearing connecting said shaft with the registering mechanism.

The contour of the cam surface 26ª is so laid out mathematically that when the cam advances to the position for any given length of log within the range of the machine, the cam rise is proportioned to the cross-sectional area of the log, and the gears 51, 53, 55 and 56 are so proportioned that disc 58 will make one revolution for each unit of volume measured for bodies of a given length, it being noted that gears 55 and 56 are of the same diameter. I propose however to provide for measuring logs of a different given length by arranging a second set of gears corresponding to the set of gears 55 and 56, and operated by shaft 54. This arrangement is best shown in Fig. 5 where it will be seen that in front of gear 55, shaft 54 has fixed to it gear 64 of less diameter than gear 55, and which meshes with a larger gear 65 on a short shaft 66 mounted in bearings in an arm 67 fastened to the bracket plate 40, forward of the arm 57ª. A disc 68 similar to disc 58 is fixed to shaft 66 and carries a revolving pin 69 similar to pin 59. To enable rock shaft 60 to be operated by this set of gears, arm 60ª is shifted along the shaft to a position where it will extend in the path of the revolving pin 69, by first loosening said screw 61 which fastens arm 60 adjustably to its shaft. When this set of gears is in action, by reason of the ratio of the individual gear to each other, a greater number of movements of the rock shaft will be necessary to register a unit of volume than was necessary when gears 55 and 56 were in operation, and consequently this set of gears is brought into action when logs of less given length are to be measured. In the particular example shown, gear 64 is half the diameter of gear 65, hence they will operate to measure bodies of half the given length of those recorded by the action of the other set of gears. By providing additional sets of gears between shafts 54 and 60 consisting of gears of different ratios, the cubic contents of bodies of other given lengths may be measured.

In order that the number of bodies or logs acting on the feeler member and passing through the machine may be counted, I provide a counting mechanism B which is mounted on the frame bar 37 at the side of the register A. This counting mechanism is operated by a vertically vibrating arm 70 operatively connected with the gearing of the counting mechanism in such manner that the vibratory movements of the arm will actuate said mechanism to indicate the number of vibrations. Arm 70 is pivoted at its forward end to the inner side of the frame bar 2 and has pivoted to its free end a link 71 whose lower end is pivoted to the end of an arm 72 fixed to a horizontal transverse shaft 73. This shaft is mounted in bearings in the frame bars 37 and 38 and is extended at its forward end within the casing of the counting mechanism and is operatively engaged with the gearing of said mechanism. A spring 74 is connected at its lower end to the frame bar 9 of the machine frame, and at its upper end to an arm 75 fixed to and extending forwardly from the shaft 73, and tends to hold arm 70 yieldingly in the path of the lower roller 30 on the forward end of the cam member 26. As a result of the construction described, arm 70 will be vibrated on each forward movement of the cam member on the return motion of the feeler member to normal position after disengaging the log, and in this way the counting mechanism will indicate the number of logs or bodies passing through the machine.

It will be noted from the foregoing description that the cam member 26 moves horizontally in a rectilinear path and that when so moved by the displacement of the feeler member under the influence of the advancing log, the cam surface on the member engages directly with the rack bar and moves the same vertically in a rectilinear path, such vertical movement operating to drive the gear train by which the registering mechanism is operated. I deem such rectilinear movement of the cam member of advantage and importance, in that I am enabled to more readily lay out the cam in the proper mathematical relation it should bear to the movement of the feeler member, and its action on the gear train is certain and reliable and results in great accuracy in measuring the volumetric contents. Due to the fact that the cam surface in its rectilinear movement, acts beneath the roller on the reciprocating rack bar in raising said bar for its active stroke, the operation of the parts is positive and free from tortional or other strains which would interfere with the accuracy of the measurements.

Due to the form, construction and arrangement of the organization as a whole, comparatively large logs, up to thirty inches in diameter or more, may be measured by the machine while maintaining a comparatively close spacing of the logs on the conveyor, the path of movement of the free end of the feeler member due to the combined movements of said member as described when displaced by the log, enabling the member to quickly return to its normal position for the next log in the limited space between them. The machine therefore provides for handling large sized logs while operating at the maximum capacity.

In the foregoing description and accompanying drawings I have set forth my invention in the particular detailed form of the parts which I prefer to adopt, but it will be understood that these details may be variously changed and modified without departing from the limits of the invention; and further it will be understood that the invention is not limited to any particular form or construction of the parts except in so far as such limitations are specified in the claims.

Having thus described my invention, what I claim is:

1. In a mechanism of the type described, the combination of a movable member adapted to be displaced by passing bodies to positions determined by the diameters of the respective bodies, means whereby said member is moved bodily in a direction opposite its displaced movement, a registering mechanism for registering the cubit contents of the bodies, and means operated by the movable member and operatively connected with the registering mechanism to actuate the same.

2. In a mechanism of the type described, the combination of a movable member adapted to be displaced by passing bodies to positions determined by the diameters of the respective bodies, means controlled by said displaced movements for moving the member bodily in a contrary direction, a registering mechanism for registering the cubic contents of the bodies, and means operated by the movable member and operatively connected with the registering mechanism to actuate the same.

3. In a mechanism of the type described, the combination of a movable member adapted to be swung forwardly by passing bodies, means whereby said member is moved bodily rearwardly, a registering mechanism for registering the cubic contents of the bodies, and means operated by the movable member and operatively connected with the registering mechanism to actuate the same.

4. In a mechanism of the type described, the combination of a movable member supported on a fulcrum and adapted to be swung forwardly on said fulcrum by passing bodies to positions determined by the diameters of the respective bodies, means for moving said fulcrum rearwardly to impart a rearward bodily movement to the member, a registering mechanism for registering the cubic contents of the bodies and means operated by the movable member and operatively connected with the registering mechanism to actuate the same.

5. In a mechanism of the type described, the combination of a movable member supported on a fulcrum and adapted to be swung forwardly on said fulcrum by passing bodies to positions determined by the diameters of the respective bodies, means for moving said fulcrum rearwardly in a rectilinear path to impart a bodily rearward movement to the member, a registering mechanism for registering the cubic contents of the bodies, and means operated by the movable member and operatively connected with the registering mechanism to actuate the same.

6. In a mechanism of the type described, the combination of a movable member supported on a fulcrum and adapted to be swung forwardly on said fulcrum by passing bodies to positions determined by the diameters of the respective bodies, means controlled by the swinging movements of the member and acting to shift the fulcrum of the same rearwardly to impart a rearward bodily movement to the member, a registering mechanism for registering the cubic contents of the bodies and means operated by the movable member and operatively connected with the registering member to actuate the same.

7. In a mechanism of the type described, the combination of a movable member supported on a fulcrum and adapted to be swung forwardly on said fulcrum by passing bodies to positions determined by the diameters of the respective bodies, a segment gear fixed to said member, a fixed rack with which the segment gear meshes, whereby when said member is swung forwardly on its fulcrum the latter will be moved rearwardly and will impart a bodily rearward movement to the member, a registering mechanism for registering the cubic contents of the bodies, and operative connections between said member and the registering mechanism to actuate the latter.

8. In a mechanism of the type described, the combination of a frame provided with guides, a supporting member movable back and forth in said guides, an arm fulcrumed on said supporting member and depending therefrom in the path of passing bodies, a fixed rack on the frame extending parallel with the guides, a segment gear on the arm meshing with the rack, whereby the lower end of the arm will be displaced by the passing bodies and in such displaced movements the arm will be shifted bodily in a direction contrary to the displaced movement, a registering mechanism to register the cubic contents of the bodies, and operative connections between the arm and registering mechanism to actuate the latter.

9. In a mechanism of the type described, the combination of a swinging feeler member located normally in the path of the advancing bodies and adapted when engaged by the bodies to be swung forwardly, and to be moved bodily rearwardly, and a registering mechanism operated by the feeler member and acting to register the cubic contents of the bodies.

10. In a mechanism of the type described, the combination of a feeler member mounted on a movable fulcrum, and located normally in the path of advancing bodies, said member adapted when engaged by the advancing bodies to be swung forwardly on its fulcrum, means for moving the fulcrum rearwardly to impart a rearward bodily movement to the member, and a registering mechanism operated by the feeler member and acting to register the cubic contents of the bodies.

11. In a mechanism of the type described, the combination of a movable feeler member adapted to be displaced by passing bodies to positions determined by the diameters of the respective bodies, a registering mechanism to register the cubic contents of the bodies, a rectilinearly movable cam member operated by the feeler member, and operative connections between the cam member and registering mechanism to actuate the latter.

12. In a mechanism of the type described, the combination of a feeler member adapted to be displaced by passing bodies to positions determined by the diameters of the respective bodies, a registering mechanism to register the cubic contents of the bodies, a rotary shaft, operative connections between the shaft and registering mechanism for actuating the latter, a reciprocating member, a rectilinearly movable cam member operated by the feeler member and engaging the reciprocating member to reciprocate it, and operative connections between the reciprocating member and the rotary shaft to actuate the latter.

13. In a mechanism of the type described, the combination of a feeler member supported on a fulcrum movable horizontally back and forth, said feeler member adapted to be swung on its fulcrum by passing bodies to positions determined by the diameters of the respective bodies, means controlled by said swinging movement to move the feeler member bodily, a rectilinearly movable cam member connected with said fulcrum to move with it, a registering mechanism for registering the cubic contents of the bodies, and operative connections between the cam member and registering mechanism to actuate the latter.

14. In a mechanism of the type described, the combination of a feeler member adapted to be displaced by passing bodies to positions determined by the diameters of the respective bodies, a registering mechanism to register the cubic contents of the bodies, a rotary shaft, operative connections between the shaft and the registering mechanism for actuating the latter, a reciprocating member moving in a vertical rectilinear path and clutched to the shaft and adapted when reciprocated to advance the shaft step by step, and a cam member movable by the feeler member in a horizontal rectilinear path and engaging the reciprocating member to reciprocate it.

15. In a mechanism of the type described, the combination of a feeler member supported on a fulcrum movable back and forth horizontally in a rectilinear path and adapted to be swung forwardly on its fulcrum by passing bodies to positions determined by the diameters of the respective bodies, means controlled by said swinging movements to move the fulcrum rearwardly and impart a rearward bodily movement to the feeler member, a cam member connected with said fulcrum to move with it in a horizontal rectilinear path, a vertically reciprocating member operated by the horizontal movements of the cam member and movable in a rectilinear path, a registering mechanism to register the cubic contents of the bodies, and operative connections between the reciprocating member and the registering mechanism to actuate the latter.

16. In a mechanism of the type described, the combination of a movable member adapted to be displaced by passing bodies to positions determined by the diameters of the respective bodies, a horizontally movable cam member operated by the feeler member and traveling in a rectilinear path, said cam member being provided with an actuating cam surface, a vertically reciprocating rack bar traveling in a rectilinear path and engaged with the upper side of said cam surface, whereby the movement of the cam in the displaced action of the feeler member will move the rack bar upwardly, a registering mechanism to register the cubic contents of the bodies, and operative connections between the rack bar and registering mechanism to actuate the latter.

In testimony whereof, I have affixed my signature hereto.

PAUL V. HOLLENBECK.